United States Patent [19]

Uemichi et al.

[11] Patent Number: 5,208,117
[45] Date of Patent: May 4, 1993

[54] BATTERY AND MANUFACTURING METHOD FOR BATTERY COVER

[75] Inventors: Sachio Uemichi, c/o Yuasa Battery Co., Ltd., 6-6, Josai-cho, Takatsuki-shi, Osaka; Shuji Takahashi, c/o Kabushiki Kaisha Honda Gijutu Kenkyusho 4-1, Chuo 1-chome, Wako-shi, Saitama, both of Japan

[73] Assignees: Sachio Uemichi, Osaka; Shuji Takahashi, Saitama, both of Japan

[21] Appl. No.: 808,311

[22] Filed: Dec. 16, 1991

[30] Foreign Application Priority Data

Dec. 18, 1990 [JP] Japan .................. 2-412008
Apr. 17, 1991 [JP] Japan .................. 3-85201
Apr. 24, 1991 [JP] Japan .................. 3-122472

[51] Int. Cl.$^5$ .................. H01M 2/36; H01M 2/26; H01M 2/02
[52] U.S. Cl. .................. 429/72; 429/121; 429/123; 429/179
[58] Field of Search .................. 429/179, 177, 178, 123, 429/121, 72

[56] References Cited

U.S. PATENT DOCUMENTS

| | | | |
|---|---|---|---|
| 1,903,448 | 4/1933 | Furtney | 429/179 |
| 4,693,949 | 9/1987 | Kellett et al. | 429/179 X |
| 4,791,347 | 12/1988 | Britton | 429/121 X |

FOREIGN PATENT DOCUMENTS

| | | |
|---|---|---|
| 60-68551 | 4/1985 | Japan . |
| 2129849 | 5/1990 | Japan . |
| 303 | of 1890 | United Kingdom ............ 429/121 |

Primary Examiner—John S. Maples
Attorney, Agent, or Firm—Armstrong, Westerman, Hattori, McLeland & Naughton

[57] ABSTRACT

A battery having a filling part and a pair of tab terminals on a convex portion of an upper surface of a cover so as to enable a connecting operation by mounting a receptacle housing of faston terminal type, and a manufacturing method for the cover for use in the battery. [1] A battery, in which projecting ends of the pair of tab terminals are located with the filling part positioned between them and are projected in the same side in a longitudinal direction so that the projecting ends are positioned on an upper surface of the cover. [2] A battery, in which two concave portions are formed on side surfaces other than those to which the receptacle housing of convex portion are mounted, the two concave portions opening only on side surfaces of the convex portion extending downward from positions displaced from the upper surface of the convex portion, or opening over areas ranging from the side surfaces of convex portion to the side surfaces of cover, and charge terminals are installed in the concave portions adjacent to their upper surfaces.

6 Claims, 7 Drawing Sheets

BATTERY AND MANUFACTURING METHOD FOR BATTERY COVER

BACKGROUND ART

This invention relates to a battery having a filling part and a pair of tab terminals on a convex portion of an upper surface of a cover so as to enable a connecting operation by mounting a receptacle housing of faston terminal type, and further to a manufacturing method for the cover for use in the battery.

Generally, batteries for use in small motorcycles and domestic electric equipments are made into very compact sizes. A battery having a filling part and terminals on an upper surface of cover, as described in Unexamined Patent Publication No. 2-129849 for example, is well known as a battery of such type. In this battery, a terminal wall, in parallel with filling parts arranged in longitudinal direction, is formed, and terminals are installed on a side surface of the terminal wall.

In the above structure, however, it is required to connect a coupler to each terminal. It is difficult to position the coupler so that connecting the coupler is easy.

On the other hand, a charge operation is generally carried out by holding a charge clip to a terminal of cover in the battery. It is hard to hold the charge clip and the terminal can be damaged by operation mistake.

Further, a method using plural molds as illustrated by FIG. 16, is well known a for manufacturing the cover by embedding a part of a terminal shown in FIG. 15 in the cover of battery. In this method, a terminal 9 is supported at its portions 90 and 92 by a movable mold B and a stationary mold D, and is disposed in a space 70 formed by an upper mold A, movable mold B, a vertically movable mold C and a stationary mold D. Synthetic resin, such as polypropylene etc. is filled in space 70 from a resin filling port 71 in the upper mold A.

In the above-mentioned method, however, filling pressure of synthetic resin, during molding, becomes extremely large, as high as 700 to 1,400 kg/cm$^2$. Consequently, longitudinal portion 91 of terminal 9 deformed to become in contact with an upper part of the stationary mold D and exposed after completion of the cover. Thus it is necessary to resort to other methods in order to prevent the possibility that the exposed portion 91 will come into contact with an electrolyte.

This invention is concerned with solving the above problem encountered in prior arts. A first object of the invention is to provide a battery having a simple positioning of the receptacle housing and allowing an easy connection of the receptacle housing, when connecting the receptacle housing of the faston terminal type to a tab terminal installed on the cover.

A second object of the invention is to provide a battery enabling a charge operation by easily connecting a standard charge clip.

A third object of the invention is to provide a manufacturing method for a battery cover preventing the terminal from being exposed and come into contact with an electrolyte.

SUMMARY OF THE INVENTION

In order to accomplish the first object in the battery of this invention, a convex portion is formed on an upper surface of a cover with a part left on it, a filling part extending in upward and longitudinal directions and a pair of tab terminals one ends of which project from the convex portion are installed on the convex portion, the other ends of the pair of terminals are extended in the cover so as to be connected to a pair of posts of a container, and projecting ends of the pair of tab terminals are located with the filling part positioned between them and are projected in the same side in a longitudinal direction so that the projecting ends are positioned on the upper surface of the cover.

In this battery, a receptacle housing is positioned by an end of the filling part and is connected to the tab terminals under a state where the housing is mounted on a part of the upper surface of the cover.

In order to accomplish the second object in the battery of this invention, the concave portion is provided on the upper surface of the cover, a pair of tab terminals are installed on one side of the concave portion, the receptacle housing, of a faston terminal type, is mounted to the one side, two concave portions are formed which open only on side surfaces of the convex portion extending downward from positions slightly displaced from the upper surface of the convex portion, or open over areas ranging from the side surfaces of convex portion to the side surfaces of cover, and charge terminals are installed in the concave portions adjacent to their upper surfaces.

In this battery, the charge clip is connected by inserting one side of clipping parts into the concave portion so as to clip the charge terminal together with an upper wall of the concave portion. This connecting operation can be done easily for the following reasons [1] to [3]. [1] The charge terminal can be clipped easily together with the upper wall of concave portion because it is installed in the concave portion adjacent to the upper surface. [2] The upper wall of concave portion has a thickness providing an easy clipping operation of the charge clip, because the concave portion is formed in such the way as opening from the position slightly displaced from the upper surface of convex portion. [3] The concave portion has a space of size into which one side of the clipping parts of charge clip can be inserted easily, because convex portion is formed which opens only on the side surface of the convex portion extending downward from the position displaced from the upper surface of the convex portion, or opens over the area ranging from the side surface of convex portion to the side surface of cover. Further, no influence is exerted on the tab terminals of faston terminal type to which the receptacle housing of faston terminal type is mounted even if any mistake is made during charge operation, because the charge operation is carried out at the charge terminals.

In order to accomplish the third object in the manufacturing method for battery cover of this invention, in the battery cover having the convex portion including the filling part on its upper surface and having a pair of tab terminals projecting from the convex portion at their one ends; plural molds are used for forming a space corresponding to a shape of the cover, the tab terminals are disposed in the space, synthetic resin is filled in the space to embed the tab terminals, plural pieces made of the same material as the filled synthetic resin are installed with distances left between them on both surfaces of embedded portions of the tab terminals, and the tab terminals are disposed in the space under this state.

In this manufacturing method, the synthetic resin piece is active to prevent the tab terminal from moving vertically in the space into which it is embedded. For this reason, there is no chance for the embedded portion to deform due to a pressure of filling the synthetic resin even if the embedded portion is long. Accordingly, there is no chance for the embedded portion of tab terminal to be exposed from the cover. Further, since the material of piece of synthetic resin is the same as that of the filled synthetic resin, an external appearance becomes uniform.

DETAILED DESCRIPTION OF THE INVENTION

First embodiment

Figure 1:
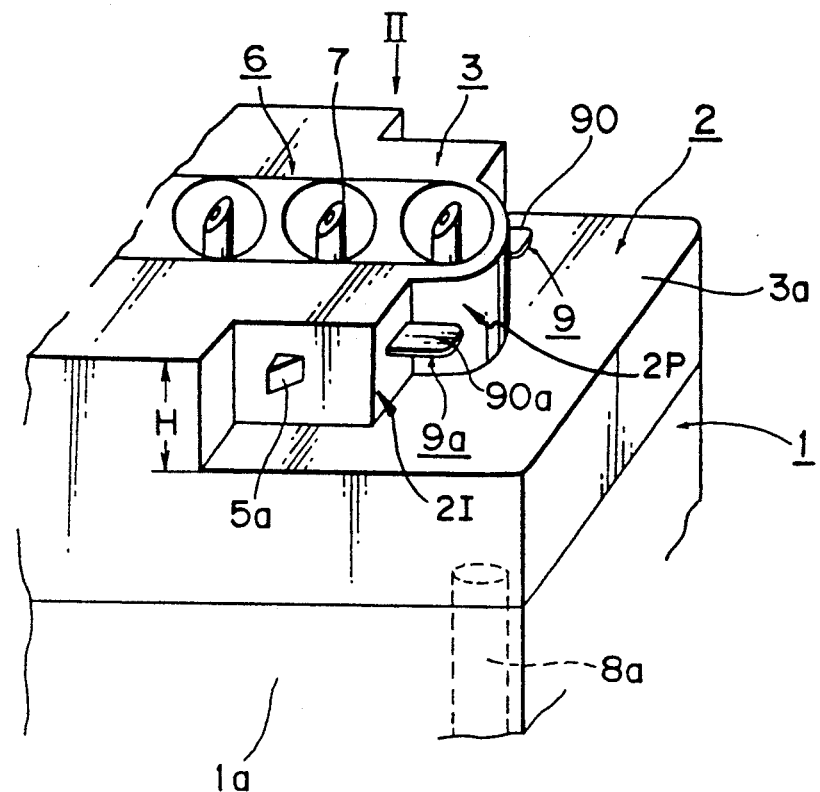
FIG. 1 is an oblique view showing a part of upper part of a battery according to a first embodiment of this invention.
Figure 2:
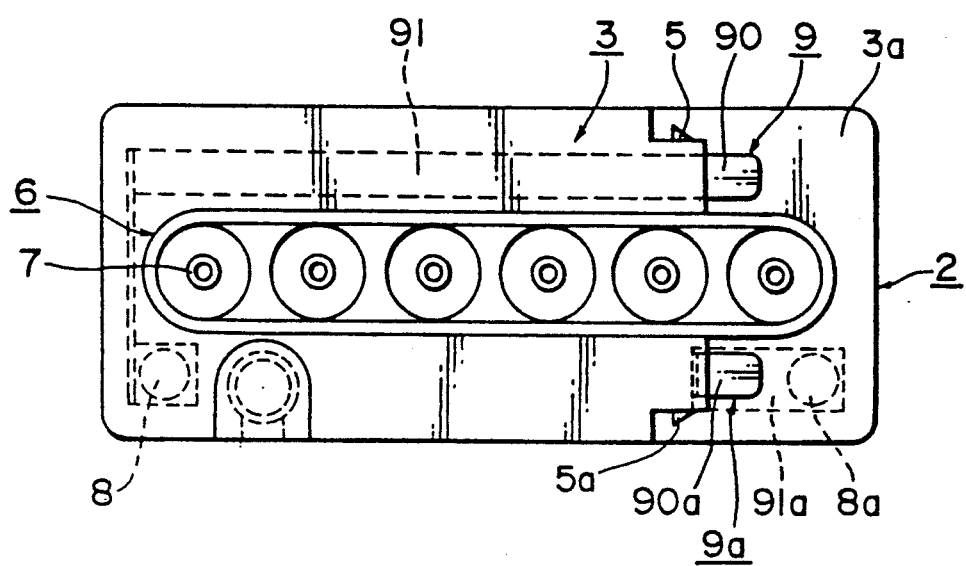
FIG. 2 is a view viewed in a direction of arrow II of FIG. 1.

FIG. 1 is the oblique view showing a part of upper part of the battery for accomplishing the first object of the present invention and FIG. 2 is the view viewed in the direction of arrow II of FIG. 1. In the both figures, 1 denotes a container and 2 denotes a cover, both having rectangular shapes in their cross sections. A convex portion 3 is formed on an upper surface of the cover 2 with a portion 3a left on it. Thus, the cover has a first top wall formed at the top of the convex portion and a second, lower, top wall formed at the portion 3a. On the convex portion 3, there provided a filling part 6 (also referred to as electrolyte filling part) extending upward and longitudinal directions (lateral direction in the figure) at a center of the convex portion 3 and a pair of conductor tab terminals 9 and 9a one ends of which project from an intermediate upstanding wall portion 2I of the convex portion 3. The intermediate wall portion 2I, is constructed so as to include a forwardly projecting portion 2P extending around one longitudinal end of the electrolyte filling part and outwardly extending portions extending from opposite sides of said projecting portion, as seen in FIG. 1. In addition, the upper end of the filling part, as seen in FIGS. 1 and 2, is in substantial alignment with the first top wall of the cover at the top of the convex portion. 90 and 90a denote projecting ends of the tab terminals 9 and 9a. The projecting ends 90 and 90a are located with the electrolyte filling part 6 positioned between them, and project to a side (right side in the figure) in the longitudinal direction so as to be positioned above the portion 3a on the upper surface of the cover 2. In FIG. 1, the projecting end 90 is located at the other side and the projecting end 90a is located at this side.

On the other hand, a pair of poles 8 and 8a (also referred to as positive and negative conductor posts) are installed on a side surface (a surface at this side of FIG. 1) 1a side of the container 1. The poles 8 and 8a are located on both longitudinal ends, i.e. the pole 8 is located on a side of the projecting ends 90 and 90a (right side in the figure) and the pole 8a is located on the opposite side (left side in the figure). As illustrated by FIG. 2, the tab terminal 9 extends through an inside of the cover 2 in a straight line to a side opposite to the projecting end 90 and around the filling part 6 and then in a straight line, i.e. extends into a large L-shaped form and finally to be connected to the pole 8. The other tab terminal 9a extends through the inside of the cover 9 in a straight line toward the projecting end 90 for a short length to be connected to the pole 8a. 5 and 5a denote stoppers, and 7 denotes a projection for breaking through a thin film which seals a filling container.

Figure 3:
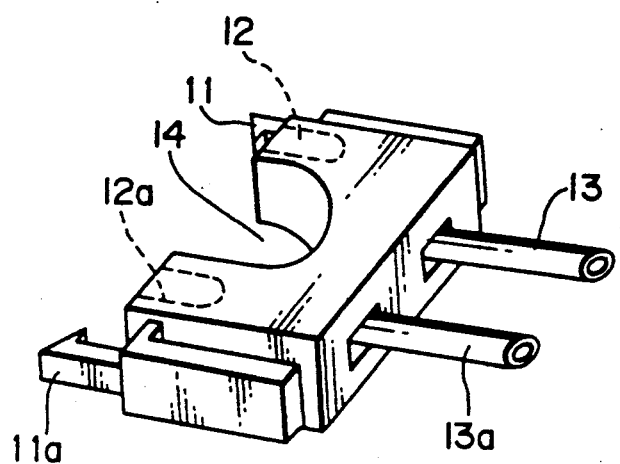
FIG. 3 is an oblique view showing a receptacle housing of faston terminal type, for reference of this invention.
Figure 11:
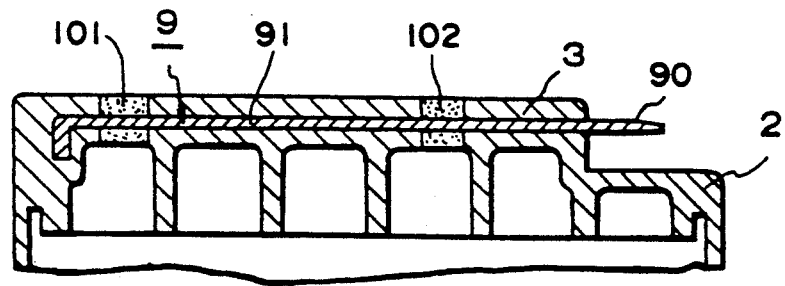
FIG. 11 is a sectional view taken on a line XI—XI of FIG. 9.

A receptacle housing of faston terminal type as shown by FIG. 3 is mounted and connected to the tab terminals 9 and 9a. In FIG. 3, 11 and 11a denote claws engaging with the stoppers 5 and 5a, 12 and 12a denote terminal holes in which the tab terminals 9 and 9a are inserted, 13 and 13a denote connecting wires, and 14 denotes a recession fitting onto an end of the filling part 6.

In the battery thus constructed, a connecting operation of the receptacle housing to the tab terminals 9 and 9a is carried out under a state where the receptacle housing is positioned by the end of the filling part 6 and placed on the portion 3a of upper surface of the cover 2. Accordingly, the connecting operation of the receptacle housing becomes easy. The projecting ends 90 and 90a of the tab terminals 9 and 9a are located with the filling part 6 positioned between them, and project to the side (right side in the figure) in the longitudinal direction so as to be positioned above the portion 3a on the upper surface of the cover 2; so that there is no possibility of a decrease in area of the filling part 6.

According to the present invention as described above, the convex portion 3 is formed on the upper surface of the cover 2 with the portion 3a left on it, and the filling parts 6 extending upward and longitudinal directions and a pair of tab terminals 9 and 9a, one ends 90 and 90a of which project from the convex portion 3, are provided on the convex portion 3. The other ends of a pair of the tab terminals 9 and 9a are extended through the inside of the cover 2 so as to be connected to a pair of the poles 8 and 8a of the container 1. The projecting ends 90 and 90a of a pair of the tab terminals 9 and 9a are located with the filling part 6 positioned between them and project to a side in the longitudinal direction so as to be positioned above the upper surface of the cover 2. Consequently, the connecting operation of the receptacle housing to the tab terminals 9 and 9a can be carried out under the state where the receptacle housing is positioned by the end of the filling part 6 and placed on the portion 3a of upper surface of the cover 2. For this reason, the connecting operation of the receptacle housing becomes easy. The projecting ends 90 and 90a of the tab terminals 9 and 9a are located with the filling part 6 positioned between them, and project to the side (right side in the figure) in the longitudinal direction so as to be positioned above the portion 3a on the upper surface of the cover 2; so that the decrease in area of the filling part 6 can be avoided.

Second embodiment

Figure 4:
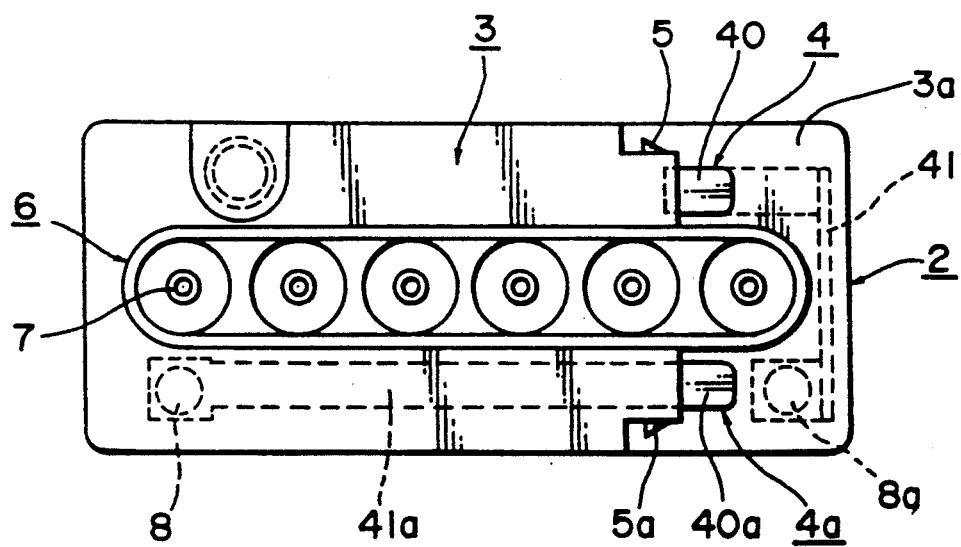
FIG. 4 is a plan view showing a battery of a second embodiment according to the invention.

FIG. 4 is the plan view showing an alternate battery the first embodiment according to the invention and is a view corresponding to FIG. 2. In FIG. 4, components attached with the same symbols as FIG. 2 represent the same or corresponding components. The structure of the cover 2 including the convex portion 3, the stoppers 5 and 5a, and the filling part 6, is similar to that of the first embodiment. Further, the structure of the container 1 including the poles 8 and 8a is also similar to that of the first embodiment.

In the present embodiment, tab terminals 4 and 4a are installed in the following manner. The tab terminal 4 corresponding to the tab terminal 9 of the first embodiment extends through the inside of the cover 2 in a straight line toward a projecting end 40 and around the filling part 6 and then in a straight line, i.e. extends into a small L-shaped form and finally to be connected to the pole 8a. The tab terminal 4a corresponding to the tab terminal 9a extends through the inside of the cover 2 in a straight line to a side opposite to the projecting end 40a to be connected to the pole 8.

In the battery thus constructed, the same effect as the first embodiment is also obtainable. That is, the connecting operation of the receptacle housing (FIG. 3) becomes easy and there is no possibility of the decrease in area of the filling part 6.

According to the structures of the tab terminals 4 and 4a of this embodiment, a length of the tab terminal 4 becomes extremely shorter than that of the tab terminal 9. Namely, a length of a portion 41 extending through the inside of the cover 2 becomes extremely shorter than that of a portion 91 (FIG. 2) of the tab terminal 9. Therefore, even if a short-circuit is produced between the tab terminals 4 and 4a, a temperature of the portion 41 of the tab terminal 4 will not become as high as that of the portion 91 of the tab terminal 9, and the cover 2 will not be molten or burnt. 41a denotes a portion of the tab terminal 4a extending through the inside of the cover 2.

The tab terminal 4a is formed into a straight shape, and the tab terminal 4 is formed into a small L-shape. Therefore, even when they are made of a copper plate etc. by punching, a loss of material will be small and a small press machine will do as compared with the case of FIG. 2. Accordingly, the faston terminal can be manufactured at a low cost.

Third embodiment

In order to minimize sizes of the batteries having the structures described in the first and second embodiments as far as possible, it can be considered that a height H (FIG. 1) of the convex portion 3 is reduced to mount a thin receptacle housing. However, it is supposed to be hard to carry out the charge operation by clipping the projecting ends 90 and 90a of the tab terminals 9 and 9a with the charge clip if the height H of the convex portion 3 is low. Because the upper surface 3a of the cover 2 and the filling part 6 are located adjacent to the projecting ends 90 and 90a. In case when the charge operation is carried out by connecting a charger to the tab terminals 9 and 9a, there is a possibility that the receptacle housing could not be mounted due to damages of the tab terminals 9 and 9a if a short-circuit is produced between the tab terminals 9 and 9a caused by some operation mistake etc. The present invention is made in due consideration of the above point.

Figure 5:
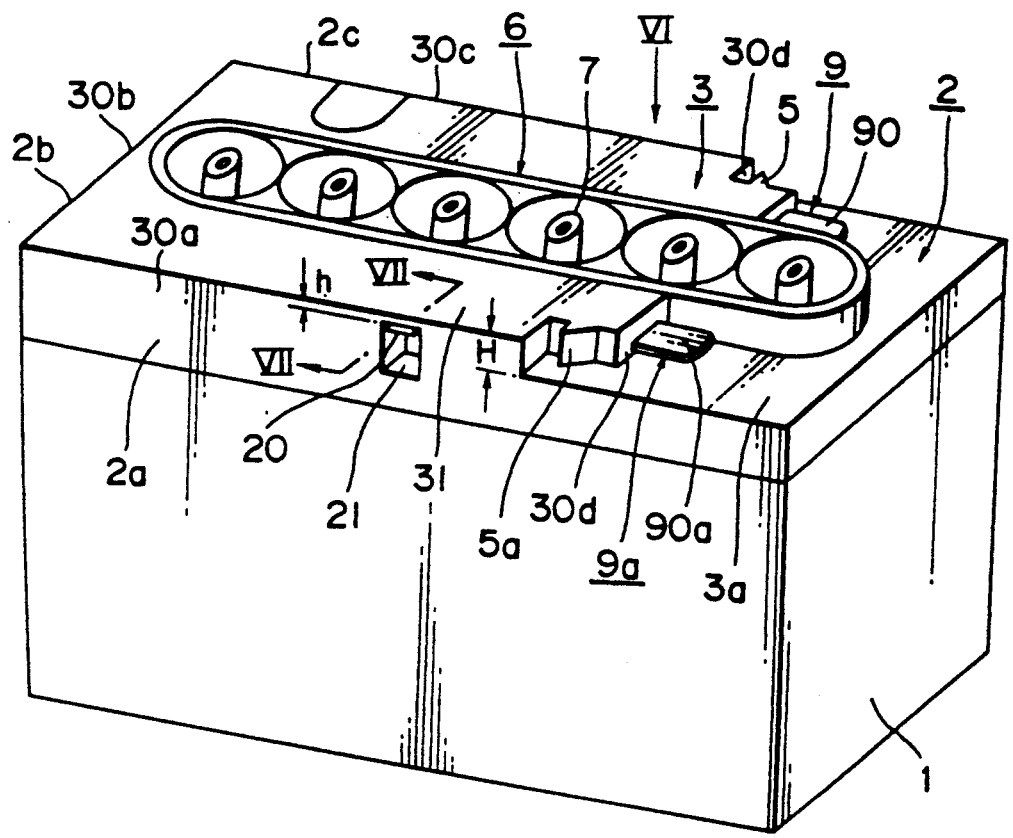
FIG. 5 is an oblique view showing a battery of a third embodiment according to the invention.
Figure 6:
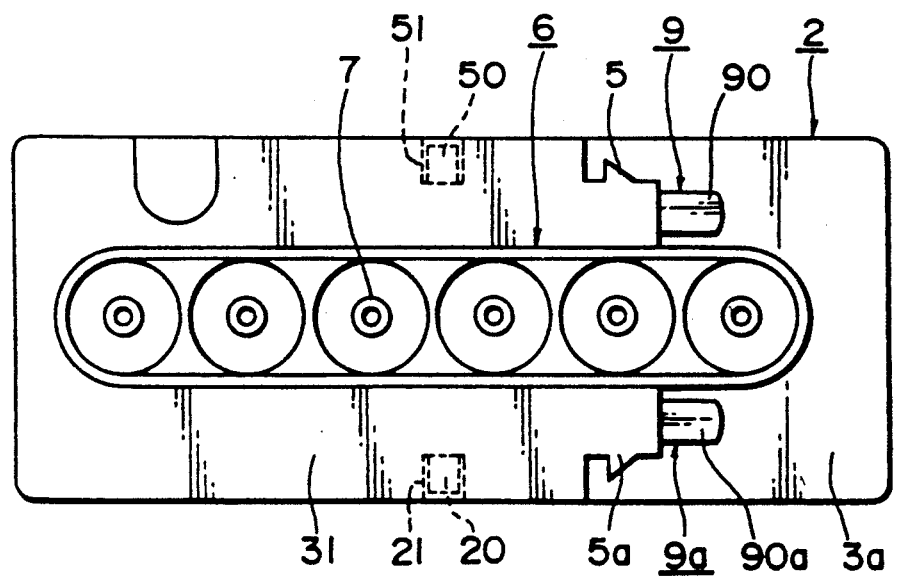
FIG. 6 is a view viewed in a direction of arrow VI of FIG. 5.

FIG. 5 is an oblique view showing the battery for accomplishing the second object of the present invention, and FIG. 6 is the view viewed in the direction of arrow VI of FIG. 5. In the both figures, components attached with the same symbols as FIG. 1 represent the same or corresponding components. In the battery of this embodiment, the height H of the convex portion 3 is smaller than that of FIG. 1. A positive charge terminal 20 and a negative charge terminal 50 (FIG. 6) are installed in the battery of this embodiment.

Figure 7:
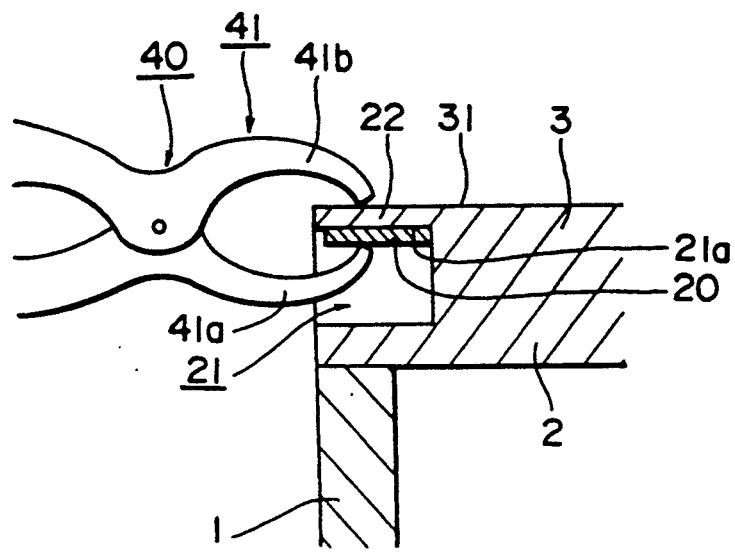
FIG. 7 is a sectional view taken on a line VII—VII of FIG. 5.

The convex portion 3 is so constructed that its three side surfaces 30a, 30b and 30c are made flush with side surfaces 2a, 2b and 2c of the cover 2. 30d denotes a side surface to which the receptacle housing of faston terminal type as shown by FIG. 3 is mounted. A concave portion 21 concaved into a rectangular parallelepiped is formed on a surface composed of the side surface 30a and the side surface 2a. The positive charge terminal 20 is installed in the concave portion 21. The charge terminal 20 is installed adjacent to an upper face 21a among inside faces of the concave portion 21 as illustrated by FIG. 7 which is the sectional view taken on a line VII—VII of FIG. 5. In this case, the charge terminal 20 does not project from the concave portion 21. The concave portion 21 extends downward and opens from a position slightly displaced by a distance (h of FIG. 5) from the upper face 31 of the convex portion 3, and its opening ranges from the side surface 30a to the side surface 2a.

On the other hand, the negative charge terminal 50 is installed in the same way as the positive charge terminal 20, in a concave portion 51 formed on the surface composed of the side surface 30c and the side surface 2c in the same manner as the concave portion 21.

In order to charge the battery thus constructed, it is enough to connect the positive and negative charge clips to the charge terminal 20 in the concave portion 21 and the charge terminal 50 in the concave portion 51 as shown by FIG. 7. Namely, in case of the concave portion 21, it is enough to put one side 41a of a clip 41 of the charge clip 40 in the concave portion 21 and to locate the other side 41b above the concave portion 21, so as to clip the charge terminal 20 together with the upper wall 22 of the concave portion 21. The same procedure may applied to the charge terminal 50.

Such connection procedure of the charge clip 40 can be done easily for the following reasons [1] to [3]. [1] Since the charge terminal 20 is installed adjacent to the upper face 21a in the concave portion 21, it can be easily clipped together with the upper wall 22. [2] Since the concave portion 21 extends downward and opens from the position slightly displaced by a distance (h of FIG. 5) from the upper face 31 of the convex portion 3, the upper wall 22 of the concave portion 21 is formed into a thickness h which can be clipped easily by the charge clip 40. [3] Since the concave portion 21 extends downward from the position slightly displaced by a distance (h of FIG. 5) from the upper face 31 of the convex portion 3 and its opening ranges from the side surface 30a to the side surface 2a, the concave portion 21 has a space large enough to incorporate the one side 41a of the clip 41 of the charge clip 40.

The above-mentioned matters are also applied to the connection of the charge clip to the charge terminal 50.

Since the charge operation is carried out at the charge terminals 20 and 50, the tab terminals 9 and 9a are not affected at all even if any mistake is made during the charge operation. Accordingly, it is possible to carry out the connection by mounting the receptacle housing even if any mistake is made during the charge operation.

The concave portion 21 and the concave portion 51 may be formed on any side surface of the convex portion 3 other than the side surface 30d on which the receptacle housing is mounted, or it may be formed on the same side surface.

The size of the concave portions 21 and 51 is not always necessary to be so large as ranging to the side surface of the cover 2, if it is provided with a space large enough to incorporate the one side 41a of the clip 41 of the charge clip 40.

According to the present invention as described above, the concave portions 21 and 51 are formed on the side surface other than the side surface 30d of the convex portion 3 to which the receptacle housing of faston terminal type is mounted, the concave portions 21 and 51 extending downward from the position slightly displaced by the distance (h of FIG. 5) from the upper face 31 of the convex portion 3 and opening only at the side surface of the convex portion 3 or ranging from the side surface of the convex portion 3 to the side surface of the cover 2, and the charge terminals 20 and 50 are installed in the concave portions 21 and 51 adjacent to the upper faces of the concave portions 21 and 51. Therefore, the charge operation can be carried out easily by connecting the standard charge clip 40, and the connecting operation can be done by mounting the receptacle housing even if any mistake is made during the charge operation.

Fourth embodiment

Figure 8:
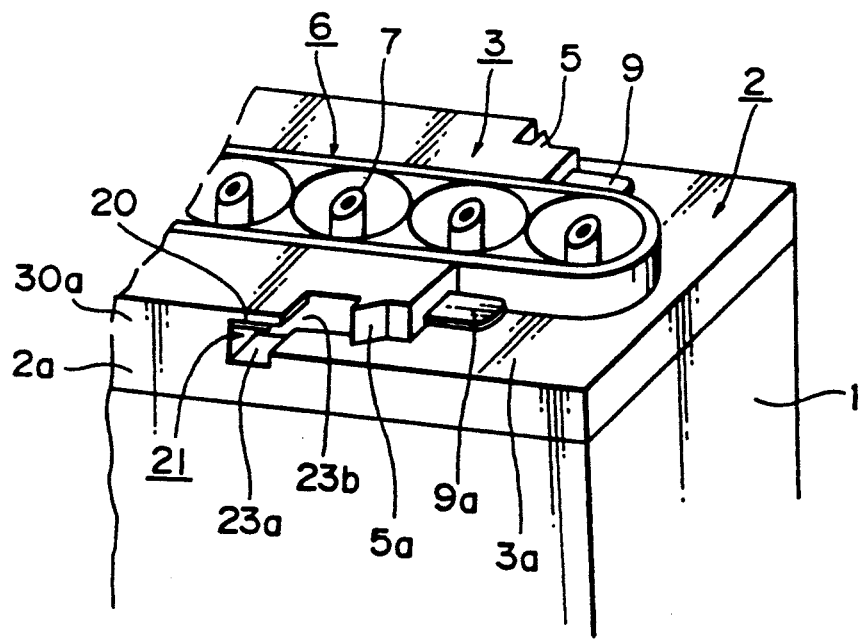
FIG. 8 is an oblique partial view showing a battery according to a fourth embodiment of this invention.

This is an alternate of the third embodiment. Namely, the concave portion 21 and 51 may be formed into a shape as illustrated by FIG. 8. In the example of FIG. 8, the concave portion 21 is formed in the vicinity of the tab terminal 9a and opens also to the tab terminal 9a side. That is, the concave portion 21 has an opening 23a on a surface composed of the side surface 30a and the side surface 2a, and has an opening 23b on the tab terminal 9a side. The opening 23b extends to the innermost of the concave portion 21. The same is applied to the concave portion 51.

In this structure, the one side 41a of the clip 41 of the charge clip 40 can be slidden on the upper surface 3a of the cover 2 to be put easily in the concave portion 21 from the opening 23b. Accordingly, the charge clip 40 can be connected to the charge terminal 20 more easily as compared with the third embodiment.

Fifth embodiment

Figure 9:
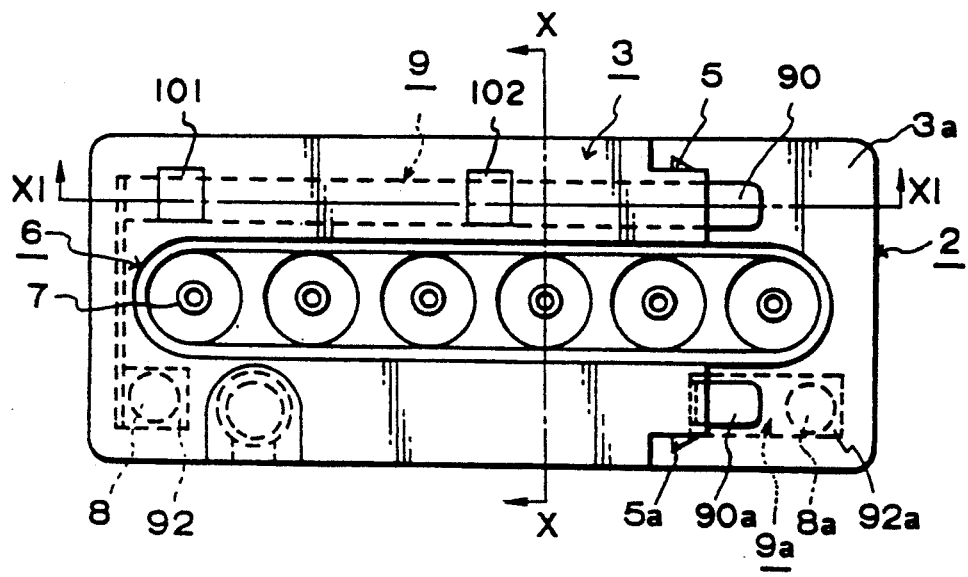
FIG. 9 is a plan view of a battery using a cover manufactured by a manufacturing method shown by a fifth embodiment according to the invention.
Figure 10:
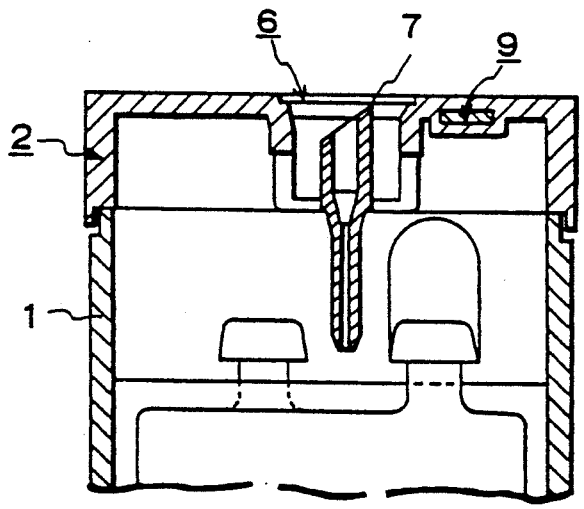
FIG. 10 is a sectional view taken on a line X—X of FIG. 9.

FIG. 9 is the plan view of the battery using the cover manufactured by the manufacturing method for accomplishing the third object of this invention, FIG. 10 is the sectional view taken on the line X—X of FIG. 9, and FIG. 11 is the sectional view taken on the line XI—XI of FIG. 9. In these figures, components attached with same symbols represent the same or corresponding components. Namely, the convex portion 3 is formed on the upper surface of the cover 2 with the part 3a left on it. The filling part 6 extending upward and longitudinal directions and a pair of tab terminals 9 and 9a one ends of which project from the convex portion 3 are formed on the convex portion 3. The projecting ends 90 and 90a of the pair of tab terminals 9 and 9a are located with the filling part 6 positioned between them, and are projected to the same side in the longitudinal direction to be positioned on the upper surface 3a of the cover 2. The tab terminals 9 and 9a are embedded in the cover 2. The tab terminal 9 is connected at its end 92 to the pole 8 of the container 1, and the tab terminal 9a is connected at its end 92a to the pole 8a of the container 1, respectively. The receptacle housing of faston terminal type as shown by FIG. 3 is mounted to the cover 2.

Figure 12:
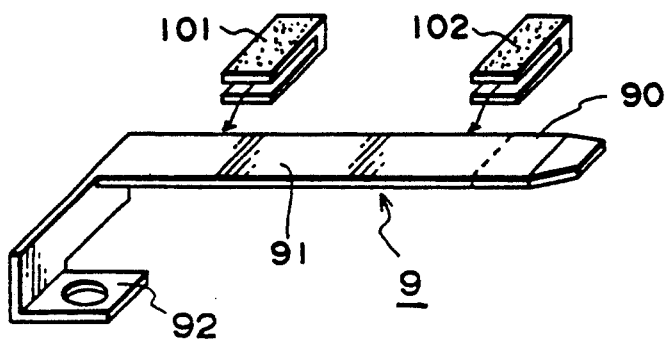
FIG. 12 is an oblique view showing a tab terminal immediately before attached with synthetic resin pieces.
Figure 13:
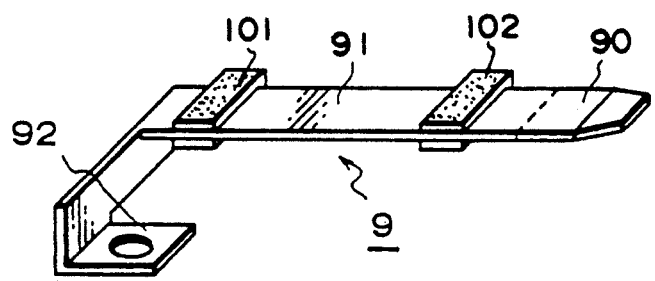
FIG. 13 is an oblique view showing a tab terminal attached with synthetic resin pieces.
Figure 14:
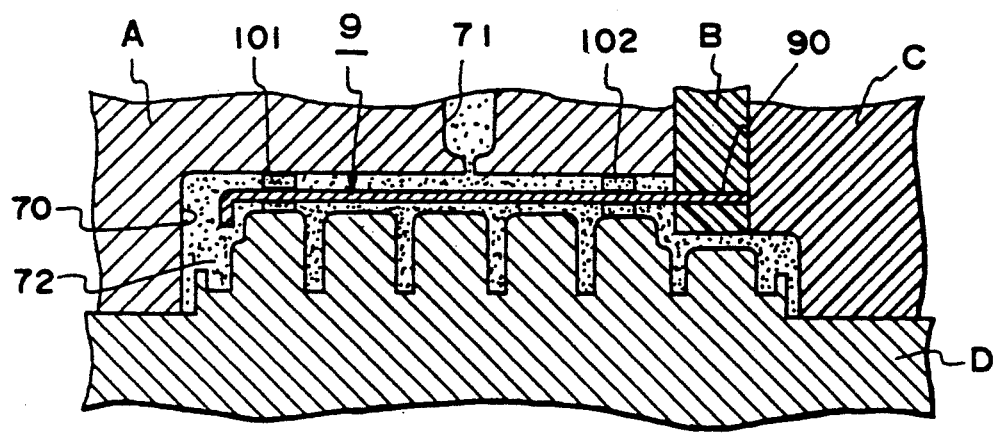
FIG. 14 is a sectional view showing a state during molding of resin.
Figure 15:
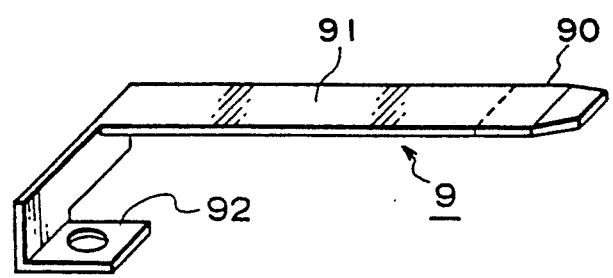
FIG. 15 is an oblique view showing a terminal for use in a conventional manufacturing method for battery cover.
Figure 16:
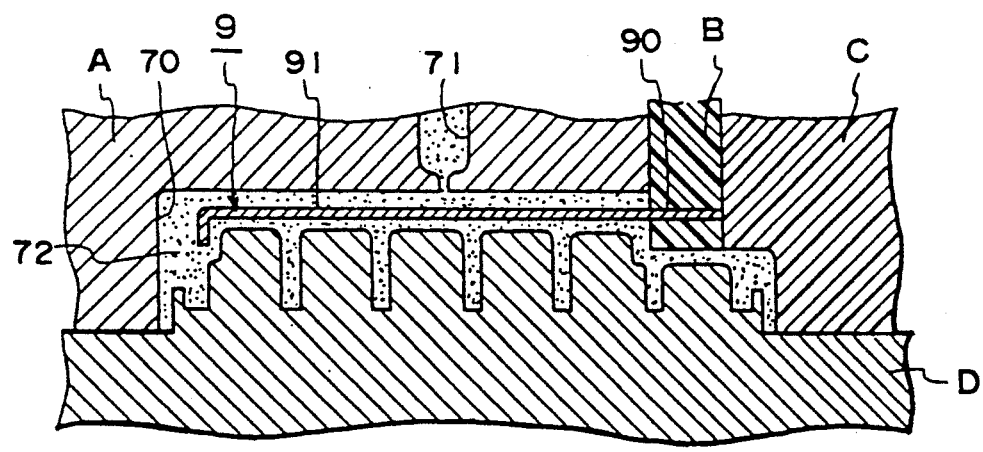
FIG. 16 is a sectional view showing a state during molding of resin in the conventional manufacturing method for battery cover.

The cover 2 of such type is manufactured by the following method including processes shown by FIG. 12 through FIG. 14. In FIG. 14, components attached with the same symbols as FIG. 16 represent the same or corresponding components. In the first place, synthetic resin pieces 101 and 102 as shown in FIG. 12 are to be prepared. Polypropylene etc. is to be used for synthetic resin. The synthetic resin pieces 101 and 102 are plates bent into U-shaped form. In the second place, the synthetic resin pieces 101 and 102 are fit to an embedded portion 91 of the tab terminal 9 with a distance left between them. This operation is to be carried out so as to clip the portion 91 of the tab terminal 9 by the synthetic resin piece 101 and 102. In the third place, the projecting end 90 of the tab terminal 9 is clipped by the longitudinally movable mold B and mounted on the stationary mold D as illustrated in FIG. 14. Although not shown in the figure, the tab terminal 9a is clipped at its projecting end 90a by the longitudinally movable mold B and mounted at its end portion 92a on the stationary mold D. In the fourth place, upper and peripheral parts of the tab terminals 9 and 9a are surrounded by the upper mold A and the vertically movable mold C. Thus, a space 70 in which the tab terminals 9 and 9a are disposed is formed by the four molds A through D. The space 70 corresponds to a shape of the cover 2. In the fifth place, synthetic resin 72 having the same material as the synthetic resin pieces 101 and 102 is filled in the space 70 from a resin filling port 71 of the upper mold A. Then, the molds A through D are separated in a little while after completion of solidification of the synthetic resin 72.

In this manufacturing method, the synthetic resin pieces 101 and 102 are active to prevent the portion 91 of the tab terminal 9 from displacing in a vertical direction within the space 72. For this reason, there is no possibility that the portion 91 is deformed by a pressure produced when filling the synthetic resin 72, even if the portion 91 is long. Therefore, there is no chance for the portion 91 of the tab terminal 9 to be exposed from the cover 2. Further, since the synthetic resin pieces 101 and 102 have the same material as the synthetic resin 72, the appearance will become uniform.

The number of fit synthetic resin piece is not necessarily be two, but it may be three or more.

According to the manufacturing method of this embodiment as described above, the portion 91 of the tab terminal 9 can be embedded completely in the cover 2 so as to prevent the tab terminal 9 from being exposed to become in contact with the electrolyte. Consequently, the tab terminal 9 can be prevented from being corroded. Further, since the synthetic resin pieces 101 and 102 become uniform in their appearances with the filled synthetic resin 72, the cover 2 looks well.

What is claimed is:

1. A battery having a container and a cover for covering an upper surface of said container, said container having vertical side and end walls and a positive conductor post and a negative conductor post in said container, said cover having side and end walls in alignment with said side and end walls of said container, an electrolyte filling part extending upward and in a direction between the end walls of said container, a first top wall extending between said side walls of said cover and one of said end walls of said cover in substantial alignment with an upper end of said electrolyte filling part, a second top wall extending between said side walls of said cover and the other of said end walls of said cover intermediate said upper surface of said container and said upper end of said electrolyte filling part, an intermediate wall extending between said end walls of said cover and interconnecting an end of said first top wall with an end of said second top wall, and a pair of conductor tab terminals, said intermediate wall having a projecting portion extending around one end of said electrolyte filling part, and outwardly extending portions extending from opposite ends of said projecting portion of said intermediate wall to said side walls of said cover, one end of each of said conductor tab terminals projecting from said intermediate wall at the opposite sides, respectively, of said projecting portion at positions above said second top wall, and the other end of each of said conductor tab terminals extending in said cover for connection to said positive and negative posts, respectively.

2. A battery as set forth in claim 1, in which the positive and negative posts are installed adjacent to both opposite ends and adjacent to one of said side walls of said container on a first side of said electrolyte filling part, one of said connector tab terminals projecting from said intermediate wall on a side of said electrolyte filling part opposite from said positive and negative posts and extending around said electrolyte filling part to one of said positive and negative posts.

3. A battery as set forth in claim 2, in which said one of said positive and negative posts is located adjacent an end of the cover towards which the conductor tab terminals project, and said one of said conductor tab terminals extends around said electrolyte filling part adjacent said end of the cover towards which the conductor tab terminals project.

4. A battery having a container and a cover for covering an upper surface of said container, said cover having side and end walls and a first top wall extending between said side walls and one of said end walls, a second top wall extending between said side walls of said cover and the other of said end walls of said cover intermediate said upper surface of said container and said first top wall, an intermediate wall extending between said end walls of said cover and interconnecting an end of said first top wall with an end of said second top wall, and a pair of conductor tab terminals, one end of each of said conductor tab terminals projecting from said intermediate wall at the opposite sides, respectively, of said intermediate wall at positions above said second top wall, a receptacle housing of faston terminal type mountable to said battery upon said second top wall, said cover having two concave portions opening on at least one side surface of said cover, said concave portions being slightly displaced from said first top wall and extending downwardly along said at least one side surface, and charge terminals located in said concave portions at an upper surface of said concave portions.

5. A battery as set forth in claim 4, in which the concave portions open also forwardly to said intermediate wall.

6. A battery as set forth in claim 4, wherein said concave portions are on opposite sides of said cover, an electrolyte filling part extends upward and in a direction between the end walls of said cover, said electrolyte filling part having an upper end in substantial alignment with said first top wall, and said intermediate wall having a projecting portion extending around one end of said electrolyte filling part.

* * * * *